Dec. 30, 1952    Z. WIESELTIER    2,623,788
LAWN AND CROP SPRINKLER
Filed June 2, 1949
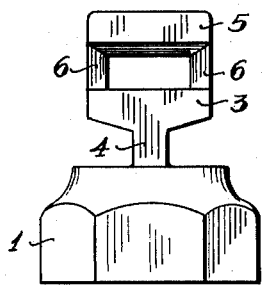
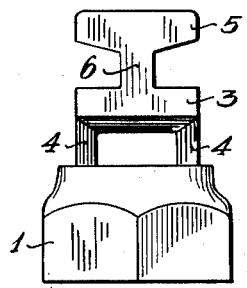
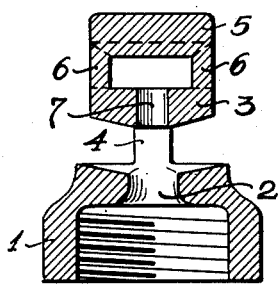
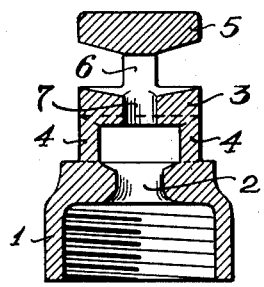
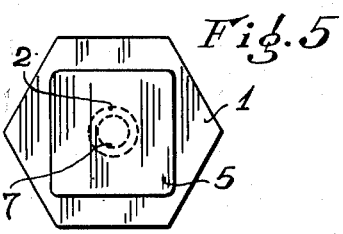
Inventor.
ZEEV WIESELTIER
By Leon M. Strauss Patented Dec. 30, 1952

2,623,788

UNITED STATES PATENT OFFICE 2,623,788

LAWN AND CROP SPRINKLER

Zeev Wieseltier, Tel Aviv, Israel

Application June 2, 1949, Serial No. 96,675
In Israel February 18, 1949

2 Claims. (Cl. 299—121)

The present invention relates to lawn and crop sprinklers of the non rotating type. It is the object of the invention to provide a sprinkler which can be manufactured at low cost, which is not exposed to the likelihood of being easily clogged by impurities of the water, which has a good performance giving a sufficiently fine dispersion of the spray and a sufficient length of throw.

To this end the new sprinkler comprises a preferably vertical mouthpiece from which the jet of water gushes, a baffle plate above the opening of the said mouthpiece and one further baffle plate superposed on the first named one and spaced therefrom and having an opening being in register with that of the mouthpiece, but being smaller than that opening. Every baffle plate, no matter what their number, has an opening smaller than the opening in the plate below, except the uppermost plate which has no such opening.

The invention is illustrated in the accompanying drawing, wherein Figs. 1 and 2 show the new sprinkler in two elevational views, turned through 90° against each other, Fig. 3 and 4 are vertical sections thereof respectively and Fig. 5 is a top view of the device.

An inverted cup 1, shaped as a hexagonal screw nut has a bore 2 in its bottom. Cup 1 forms a mouthpiece and is destined to be screwed on the upper end of a riser (not shown) and to function as a nozzle. A baffle plate 3 is connected with part 1 by two oppositely arranged ribs 4. The ribs 4, baffle plate 3, and cup 1 cooperate to define a lower delivery slot having upper and lower walls. Above the baffle plate 3 there is provided a second baffle plate 5 connected to the first plate 4 by two oppositely arranged ribs 6 located in staggered relation to the ribs 4. The ribs 6 cooperate with the baffle plates 3 and 5 to define an upper delivery slot having upper and lower bounding walls. Baffle plate 3 has a central hole 7 in line with bore 2, but of a diameter smaller than that of the latter. The jet leaving through bore 2 is partly dispersed by the baffle 3 and partly enters the bore 7 to be dispersed by the baffle 5. As clearly illustrated in Figures 3 and 4, the upper and lower delivery slots each including a pair of communicating passageways diverging upwardly and outwardly with respect to the longitudinal outer line of the sprinkler and on opposite sides of the center line.

The radial spray leaving the gap between the top of part 1 and the baffle plate 3 is interrupted by the ribs 4 with the result that the part of the field corresponding to the range of the spray taken up by these ribs is not properly watered. This deficiency is made up by the spray dispersed by baffle 5, covering the range not watered through the presence of ribs 4.

What I claim is:

1. A lawn and crop sprinkler comprising a mouthpiece having a longitudinally extending opening, a first baffle plate spaced from said mouthpiece, said baffle plate being provided with an aperture aligned with the opening of said mouthpiece, a first pair of ribs arranged in substantially spaced parallel relation with respect to each other intermediate said mouthpiece and first baffle plate and secured therebetween, said first pair of ribs, baffle plate and mouthpiece cooperating to define a first delivery slot, a second baffle plate arranged in superposed spaced relation with respect to said first baffle plate, and a second pair of ribs arranged in substantially spaced parallel relation with respect to each other and in staggered relation with respect to said first pair of ribs, said second pair of ribs being arranged intermediate said first and second baffle plate and secured therebetween, said second pair of ribs and said baffle plates cooperating to define a second delivery slot arranged substantially transversely of said first delivery slot.

2. A claim according to claim 1, wherein said mouthpiece is vertically disposed and wherein each of said delivery slots is provided by a pair of communicating passageways diverging upwardly and outwardly with respect to the longitudinal center line of said sprinkler and on opposite sides of said center line.

Z. WIESELTIER.

REFERENCES CITED

The following references are of record in the file of this patent:

UNITED STATES PATENTS

| Number | Name | Date |
|---|---|---|
| 1,674,480 | Nelson | June 19, 1928 |
| 1,783,237 | Greer | Dec. 2, 1930 |
| 2,005,600 | Tappen | June 18, 1935 |
| 2,068,094 | Webre | Jan. 19, 1937 |
| 2,314,754 | Baird | Mar. 23, 1943 |
| 2,375,528 | De Flon | May 8, 1945 |
| 2,446,918 | Goddard | Aug. 10, 1948 |

FOREIGN PATENTS

| Number | Country | Date |
|---|---|---|
| 103,488 | Great Britain | Jan. 15, 1917 |